Patented July 18, 1944

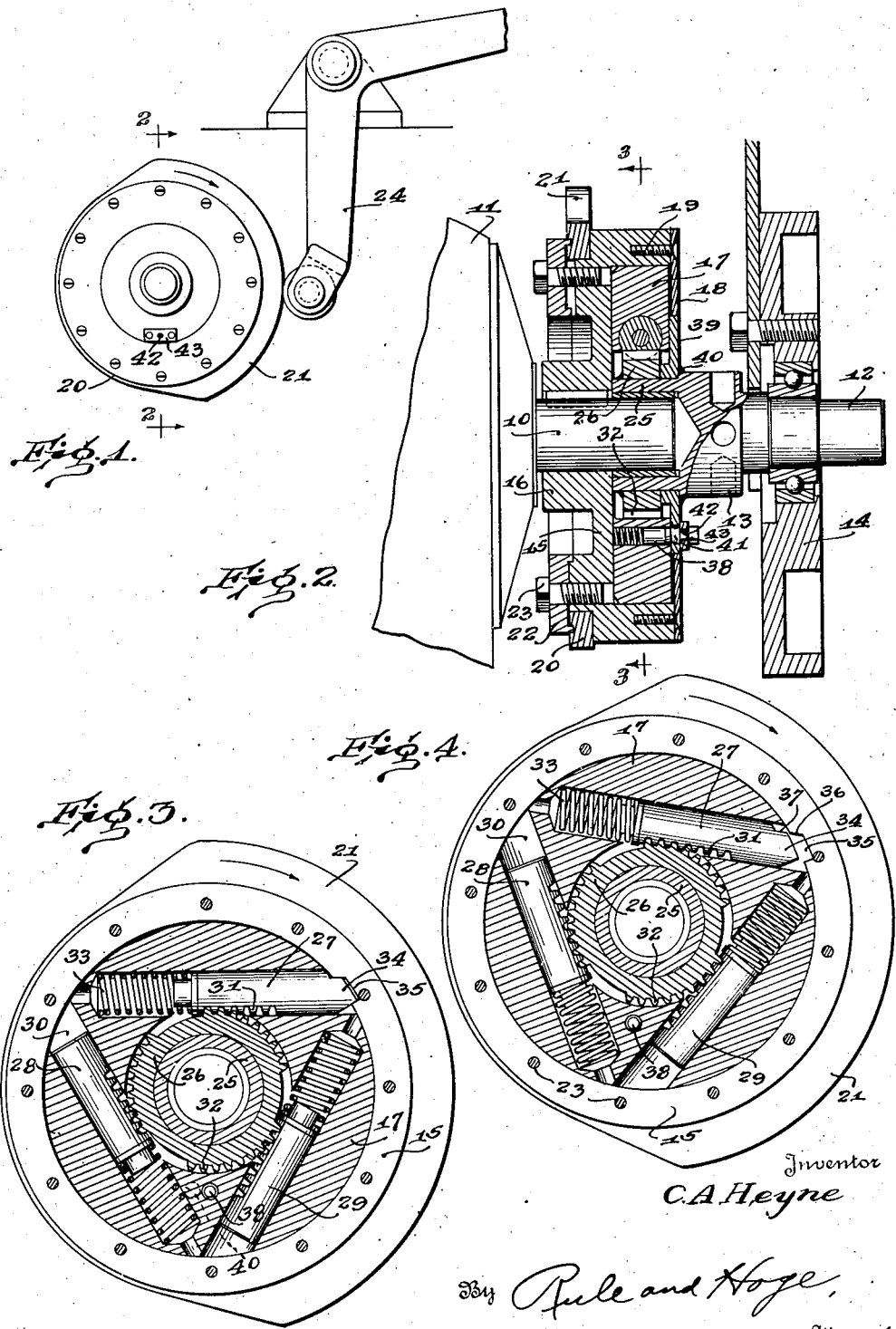

2,353,824

UNITED STATES PATENT OFFICE 2,353,824

OVERLOAD CLUTCH

Clarence A. Heyne, Alton, Ill., assignor to Owens-Illinois Glass Company, a corporation of Ohio Application August 27, 1942, Serial No. 456,306

12 Claims. (Cl. 192—56)

My invention relates to a clutch mechanism providing a driving connection between a driving element and a driven element and operable automatically to disconnect said elements when the driven element is overloaded.

An object of the invention is to provide a simple, practical and reliable device of the character indicated which may be used to protect any driven apparatus or machine against abnormal strains and breakage which might otherwise occur when the mechanism becomes jammed or when from any other cause an abnormal load is placed on the driving element.

Other objects of the invention will appear hereinafter.

Referring to the accompanying drawing:

Fig. 1 is an elevational view of an apparatus embodying the present invention.

Fig. 2 is a sectional elevation at the line 2—2 on Fig. 1.

Fig. 3 is a section at the line 3—3 on Fig. 2.

Fig. 4 is a view similar to Fig. 3, but showing the relative position of parts when the device has operated to disconnect the driving and driven element.

The driving element as herein shown comprises a driving shaft 10 which may be rotated continuously as by means of an electric motor operating through speed reduction gearing contained within a gear casing 11. A driven element herein shown as a shaft 12 is formed with an integral head 13 herein referred to as the driven clutch member. The shaft 12 is journaled in a stationary supporting member 14. The clutch device includes a driving member in the form of a disk 15 formed with a peripheral flange. The hub 16 of the disk is keyed to the drive shaft. The flanged disk provides a casing in which is housed an annular floating element or disk 17. A front plate 18 attached by screws 19 to the flange of the disk 15, retains the disk 17 in position within the casing. A cam ring 20 formed with an integral cam 21, is clamped to the plate 15 by means of a clamping ring 22 and bolts 23. The cam operates through a bell crank lever 24 to actuate any desired mechanism (not shown).

The head 13 is formed with an integral tubular extension 25 forming a stub shaft on which is mounted a pinion 26 welded or keyed to the shaft 25. Rack bars 27, 28 and 29 are mounted in cylindrical openings or bores 30 in the disk 17. Each rack bar is formed with rack teeth 31 which mesh with segmental racks 32 formed on the pinion 26. Coiled compression springs 33 are placed in the bores 30 and provide driving connections between the rack bars and the floating disk 17. The rack bar 27 serves as a connector between the pinion 26 and the driving member 15, and for this purpose is formed at its outer end with a dog 34 or extension which enters a correspondingly shaped recess 35 formed in the inner surface of the flanged driving disk 15. The notch 35 provides a surface 36 which is inclined to its direction of movement about the axis of the driving shaft and engages a surface 37 parallel thereto on the dog 34.

In operation the driving member 15 of the clutch is rotated by the drive shaft 10 and having driving connection with the rack bar 27 through the contacting surfaces 36 and 37, rotates the rack bar about the axis of the driving shaft, and thereby rotates the gear 26 and the driven shaft 12. If an abnormal load is placed on the driven shaft, the resistance of the pinion 26 to continued rotation with the connector bar 27, causes the latter to be retracted to the Fig. 4 position in which it is released from the driving member, permitting the latter to rotate idly while the driven member remains at rest.

When the clutch members are thus disconnected, the floating disk 17 is automatically locked to the driven member 13 by means including a spring actuated detent 38 mounted in the floating disk. A ring 39 welded at 40 to the head 13, is formed with an opening 41 which is brought into alignment with the detent 38 by the relative rotation of the clutch members while the locking dog is being retracted. The detent then snaps into the opening 41 and holds the clutch members disconnected until the detent is manually released.

The rack bars 28 and 29 are provided in addition to the rack bar 27 to provide added resistance to the relative rotation of the clutch members, or in other words to provide for an increase in the load that must be placed on the driven element to operate the clutch. In this connection it will be noted that relative rotation of the gear 26 and the floating disk is required to withdraw the locking dog 34, and at the same time this relative rotation moves the rack bars 28 and 29 against the force of their compression springs. The additional rack bars further serve to balance the construction.

When it is desired to reset the clutch mechanism, the locking detent 38 may be forced inwardly beyond the opening 41 by projecting a suitable tool through a restricted opening 42 in a keeper plate 43 which overlies the opening 41 and is attached to the ring 39. The operator may then rotate the driven element by hand to project the locking dog to locking position. This is facilitated by the force of the springs 33.

Modifications may be resorted to within the spirit and scope of my invention.

I claim:

1. Clutch mechanism comprising a driving member and a driven member rotatable about a common axis, means providing driving connection between said members including a connector bar carried by one said member and slidably mounted for lengthwise movement relative thereto in a direction transverse to said axis, into and out of driving connection with the other said member, spring means for holding said connector in operative position, and means for causing resistance to movement of the driven member to move said connector in opposition to the spring means and disconnect said members.

2. The combination with a drive shaft and a driven shaft rotatable about a common axis, of clutch mechanism comprising a driving member connected to the drive shaft, a driven member connected to the driven shaft, a connector bar mounted for rotation with the driven member and slidable relative thereto in a direction transverse to said axis, into and out of an operative position in contact with the driving member, a spring arranged to move and hold said connector in said operative position, and a rack and pinion forming an operating connection between said cononector bar and said driven member, said pinion being mounted for rotation about said axis.

3. Clutch mechanism comprising a driving member and a driven member rotatable about a common axis, a floating element mounted to rotate with the driving member, a connector bar slidably mounted in the floating element and slidable lengthwise therein relatively to said members, to and from an operative position in which it provides a driving connection between said members, a compression spring holding said connector bar in operative position, and operating means between the driven member and said connector bar for sliding said connector bar within the floating element and against the compression force of said spring to an inoperative position when the driving force applied to said driven member reaches a predetermined degree.

4. Clutch mechanism comprising a driving member and a driven member rotatable about a common axis, a floating element rotatable about said axis, a cononector slidably mounted in the floating element for movement therein relatively to said members, into and out of an operative position in which it provides a driving connection between said driving and driven members, a spring for holding said connector in said operative position, and means providing an operating connection between the driven member and said connector for sliding the latter within said floating element in opposition to the spring and thereby disconnecting said members.

5. Clutch mechanism comprising a driving member and a driven member rotatable about a common axis, a floating element rotatable about said axis, a connector slidably mounted in the floating element for movement therein relatively to said members, into and out of an operative position in which it provides a driving connection between said driving and driven members, a spring for holding said connector in said operative position, means providing an operating connection between the driven member and said connector for sliding the latter within said floating element in opposition to the spring and thereby disconnecting said members, and automatic means for locking said floating element to the driven member when the latter is disconnected from the driving member.

6. Clutch mechanism comprising a driving member and a driven member rotatable about a common axis, a floating element rotatable about said axis, a connector slidably mounted in the floating element for movement therein relatively to said members, into and out of an operative position in which it provides a driving connection between said driving and driven members, a spring for holding said connector in said operative position, and a pinion connected to rotate with the driven member and having driving connection with said connector for sliding the latter in said floating element.

7. A clutch mechanism comprising a driving member and a driven member rotatable about a common axis, a pinion connected to rotate with one of said members about said axis, a rack bar in driving engagement with said pinion and extending tangentially thereof, and spring means for holding said rack bar in a position in which it forms a driving connection between said members.

8. Clutch mechanism comprising a driving member and a driven member rotatable about a common axis, a floating element rotatable about said axis, a pinion connected to rotate with one of said members, rack bars mounted for lengthwise movement in said floating element and meshing with said pinion, one of said rack bars being movable into and out of position to form a driving connection between the driving and driven members, and springs for holding the rack bars in a predetermined position relative to the said pinion.

9. Clutch mechanism comprising a driving member and a driven member rotatable about a common axis, a floating element rotatable about said axis, a pinion connected to rotate with one of said members, rack bars mounted for lengthwise movement in said floating element and meshing with said pinion, one of said rack bars being movable into and out of position to form a driving connection between the driving and driven members, and springs for holding the rack bars in a predetermined position relative to the said pinion, said rack bars being arranged at different angular positions around the said axis of rotation and extending tangentially of the said pinion.

10. The combination with a driving shaft and a driven shaft rotatable about an axis, of clutch mechanism comprising a driving member and a driven member connected respectively to said shafts, said driving member comprising a casing keyed to said shaft, a floating disk mounted in said casing for rotation about said axis and relative to said casing, a pinion fixed to the driven member, a plurality of rack bars slidably mounted for lengthwise movement within said floating disk, said rack bars being arranged tangentially to the said pinion and having rack teeth meshing with said pinion, a dog carried by one of said rack bars and having a driving connection with the said driving member, and compression springs interposed between said rack bars and the floating disk.

11. Clutch mechanism comprising a driving member and a driven member rotatable about a common axis, a floating element rotatable about said axis, a pinion secured to one of said members for rotation therewith about said axis, a rack bar mounted for lengthwise movement in said floating element into and out of position to form a driving connection between the driving member and the driven member, said rack bar having rack teeth in mesh with said pinion, and a spring for holding the rack bar in a predetermined position relative to said pinion.

12. The combination with a driving shaft and a driven shaft rotatable about the same axis, a clutch mechanism comprising a driving member and a driven member connected respectively to said shafts, said driving member comprising a casing keyed to the driving shaft, a floating disk mounted in said casing for rotation about said axis and relative to said casing, a pinion secured to the driven member for rotation therewith about said axis, a rack bar slidably mounted for lengthwise movement within said floating disk in a direction transverse to said axis into and out of engagement with said casing, said casing and rack bar having co-operating surfaces shaped and arranged to provide a driving connection between the casing and said rack bar, said rack bar having a driving connection with said pinion, and a compression spring held under compression between said floating disk and the rack bar and yieldingly holding the rack bar in driving connection with said casing.

CLARENCE A. HEYNE.